United States Patent [19]

Murphy

[11] 4,033,247

[45] July 5, 1977

[54] VENT STRUCTURE

[75] Inventor: Dennis E. Murphy, Costa Mesa, Calif.

[73] Assignee: McDonnell Douglas Corporation, Long Beach, Calif.

[22] Filed: Dec. 17, 1975

[21] Appl. No.: 641,429

[52] U.S. Cl. .................... 98/119; 49/31; 49/141; 137/513.3; 244/119; 244/129.1

[51] Int. Cl.² ........................ F23L 17/00

[58] Field of Search ............ 244/119, 129 R; 137/513.3, 527; 49/31, 141; 52/1; 98/119, 2.18, 74, 77, 79, 95

[56] References Cited

UNITED STATES PATENTS

| 789,627 | 5/1905 | Pullman | 98/74 |
|---|---|---|---|
| 2,194,878 | 3/1940 | Tracy | 98/119 |
| 3,057,288 | 10/1962 | Papsdorf | 98/119 |

Primary Examiner—Ronald C. Capossela
Attorney, Agent, or Firm—G. W. Finch; W. J. Jason; D. L. Royer

[57] ABSTRACT

A vent structure for equalizing the pressure on opposite sides of a structure including a plenum formed at least in part by movable vent panel and a hinged panel supporting wall having overcenter biasing means, the plenum being pneumatically connected to the side of the structure which will be the high pressure side so that the condition requiring venting applies a differential pressure across the hinged wall which tends to force it overcenter against the overcenter biasing means thereby removing the normal support from the vent panel which moves to open a vent passageway. Spring-loaded flapper doors may be included in the plenum forming structure to enable relief of pressure in the opposite direction.

18 Claims, 4 Drawing Figures

VENT STRUCTURE

BACKGROUND OF THE INVENTION

There are many cases where it is desired to control the flow of mediums, such as air, from one portion of a structure to another by restricting the flow thereof, yet provide means to reduce the restriction of flow during emergency conditions such as those which might otherwise produce enough force to fail the intervening structure. An example of this is in the floor of a wide-bodied aircraft wherein the relatively large volume of the cabin space above the floor must be vented to the space underneath the cabin floor when the underfloor volume is rapidly decompressed. If improperly vented, the relatively small differential pressure which can be developed across the cabin floor multiplied by the relatively large floor area can generate sufficient force to fail the floor and do structural damage to the aircraft. This problem has been recently recognized by governmental agencies who have promulgated regulations requiring means in aircraft to assure that a decompression in any compartment in an aircraft caused by a hole of at least 20 square feet can be safely accommodated. An obvious expedient to meet the requirement in such aircraft is to reinforce the floor so that it can withstand decompression loads structurally. However, such a solution is impractical in that it requires extensive retrofit of aircraft presently in service and increases the weight of the aircraft without a corresponding increase in efficiency, thus raising the overall cost of the aircraft to fly.

The prior art solution of providing simple blow-out panels cannot be used in most instances because their operation can be triggered by passenger applied forces. Another solution to the problem can be seen in a patent application by Robert G. McIntyre and Otto J. Minnich entitled "Frangible Aircraft Floor," U.S. Pat. Ser. No. 578,479 now U.S. Pat. No. 3,938,764 which was filed 19 May 1975, and is assigned to applicants' assignee. It has been used to provide venting through a floor structure without decreasing the useful load-carrying capacity of the aircraft. However, frangible floors cannot be used in all applications and, therefore, variable area vents which actuate automatically and are resistant to the tampering of passengers have been required.

BRIEF DESCRIPTION OF THE INVENTION

The present invention includes a hingedly mounted vent panel which normally restricts the flow of air between the upper and lower portions of an aircraft fuselage. The restriction is required so that the ventilating, air conditioning and heating air flows of the aircraft can be controlled throughout the cabin. The hinged vent panel is retained in its normal position by a pair of hinged plates which are biased overcenter against stops and form one wall of a differential pressure sensing plenum chamber. Assuming that the upper portion of the aircraft fuselage is larger than the lower portion, the plenum chamber is pneumatically connected to remain at the pressure of the upper portion. When a rapid decrease in pressure occurs below the floor, a differential pressure is generated across the two hinged plates which causes them to move against the biasing means overcenter to release the support for the vent panel which then swings out of the way to a position which no longer restricts flow between the upper and lower portions of the aircraft fuselage. Once the emergency condition is over, the vent panel is pulled toward its original position until the biasing means snaps the hinged plates back into their vent panel supporting position.

Normal venting between the upper and lower portions of the cabin can occur through openings in the vent panel which are located below the hinged plates and these can also be used to relieve a differential pressure condition wherein the low pressure side is the upper portion of the fuselage. However, in some instances the air conditioning, heating and ventilating requirements are such that the restriction is so great that an unwanted differential pressure in the opposite direction can build up across the floor. For this reason flapper doors can be included in the hinged plates which blow upwardly during decompression of the upper portion of the fuselage to allow relief of the differential pressure without damage to the floor. This is normally not a critical situation, however, since the volume above the floor of a passenger aircraft is normally much greater than the volume below it.

It is therefore a principal object of the present invention to provide means for relieving differential pressures which may be undesirably applied across a structural wall or floor structure.

Another object is to provide venting means which automatically respond to predetermined differential pressure to open a larger-than-normal venting area for relieving a differential pressure.

Another object is to provide vent means which are economical to manufacture, easy to install, tamper-proof and easy to reset after their use.

Another object is to provide vent means for an aircraft which blend in with the general decor of the aircraft and therefore do not unnecessarily alarm passengers.

Another object is to provide a vent structure which, upon application of a predetermined differential pressure, self actuates to open a large vent passageway.

Another object is to provide an emergency venting structure which opens in response to a sensed differential pressure but not in response to externally applied force.

These and other objects and advantages of the present invention will become apparent to those skilled in the art after considering the following detailed specification which discloses a preferred embodiment thereof in conjunction with the accompanying drawings wherein:

DESCRIPTION OF THE SHOWN EMBODIMENT

Figure 1:
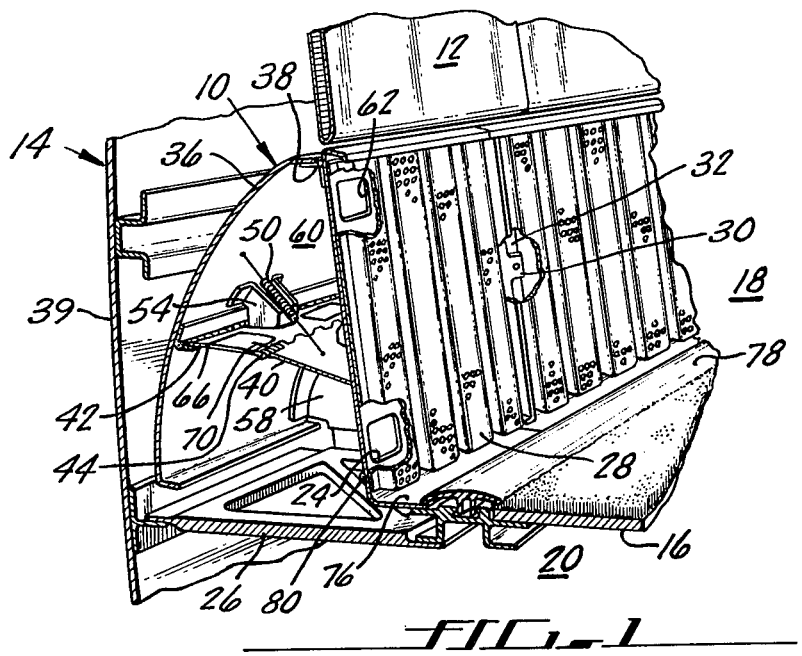
FIG. 1 is a cutaway perspective view of a portion of the side wall of an aircraft having the vent structure of the present invention installed therein.

Referring to the drawings more particularly by reference numbers, number 10 in FIG. 1 refers to a vent structure 10 installed in the interior wall 12 of an aircraft fuselage 14 adjacent the passenger compartment floor 16 which normally divides the upper fuselage volume 18 from the lower fuselage volume 20. The vent structure 10 is shown positioned and pneumatically connected for the case where the upper portion space 18 is larger than the lower portion space 20. Should the opposite be the case, the vent structure 10 could just as easily be installed below the floor 16 to protect the floor 16 from differential pressures thereacross with the high pressure being in the space 20. The normal case, however, is for the space 18 to be larger than the space 20 and therefore protection must be provided to prevent differential pressure across the floor 16 with the high pressure in the space 18 due to a rupture of the fuselage integrity below the floor 16.

Air conditioning, heating, and ventilating needs in most aircraft require that restricted flow occurs throughout the passenger compartment or upper fuselage space 18 during the flight. Therefore, the vent structure includes a vent panel 22 which may include small vent orifices 24 to allow a selected quantity of air to pass therethrough and through suitably open floor members 26 hidden therebehind. The vent orifices 24 are usually covered by decorative means such as the grille 28 shown.

Figure 2:
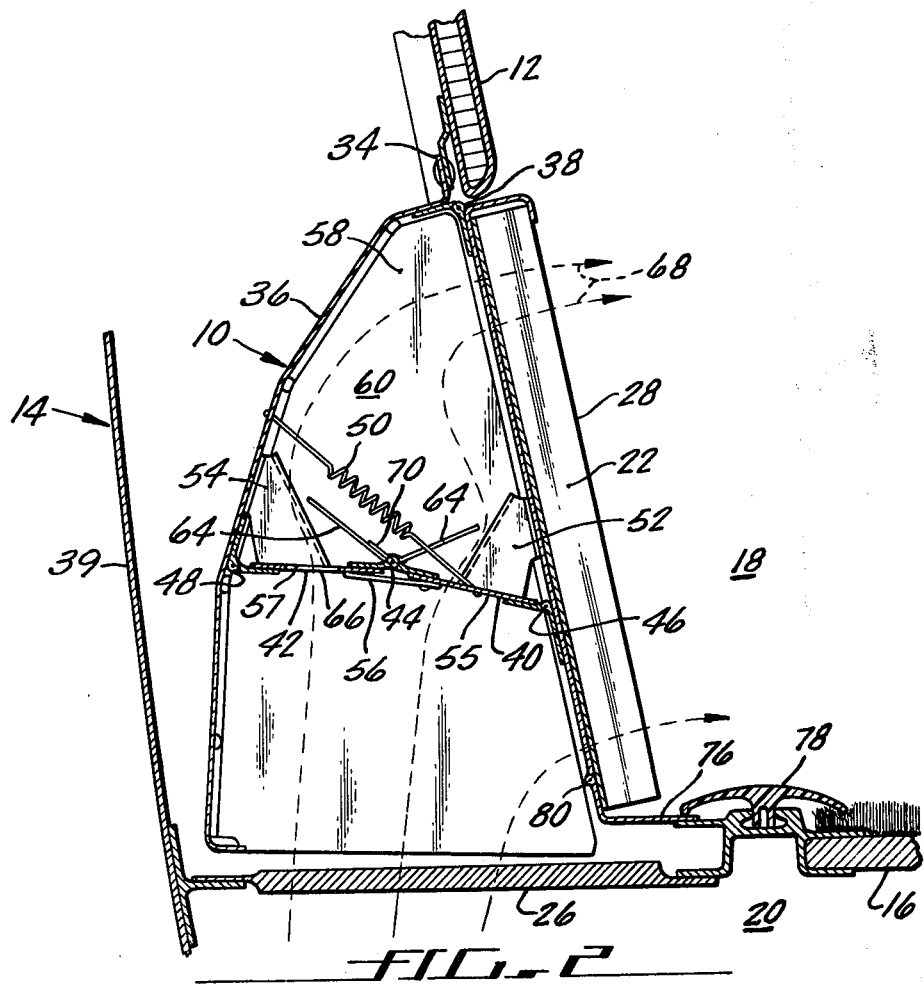
FIG. 2 is a side cross-sectional view of the vent structure of FIG. 1 showing its position when it is called upon to vent large amounts of air from the lower portion of the aircraft fuselage to the upper portion.

The vent structure 10 can be connected to the structure of the aircraft by any suitable means such as structural side extensions 30 which connect to adjacent structure 32 or by upwardly extending extensions 34 such as are shown in FIG. 2 which connect the structure 10 to the interior wall 12. Any other suitable connection means can also be used.

The vent panel 22 is connected to a shell member 36 by means of a piano-type hinge 38 which allows the vent panel 22 to swing back toward fuselage wall 39. The rotation of the vent panel 22 about the hinge 38 is normally prevented by a pair of plates 40 and 42 which are connected together by a piano-type hinge 44. In addition, plate 40 is connected to the vent panel by means of the piano hinge 46 and the plate 42 is connected to the shell 36 by means of another piano hinge 48. Suitable biasing means such as the spring 50 urge the plates 40 and 42 toward vent stops which may be the separate stops 52 and 54 connected respectively to the vent panel 22 and the shell 36, or the stop member 56. The stop member is shown connected to plate 40 in position to bear against plate 42 to prevent further movement of the plates 40 and 42 in the direction caused by the biasing spring 50 when the structure 10 is in the position shown in FIG. 2. This, of course, is also accomplished by the stops 52 and 54 which bear against plates 40 and 42 respectively with included abutment surfaces 55 and 57.

The plates 40 and 42, the shell 36, the portion of the vent panel 22 above hinge 46 and the opposite side walls such as the side wall 58 shown form a plenum chamber 60. The formulation of the plenum chamber 60 may be assisted by suitable seals incorporated into the edges of the plates 40 and 42 and the panel 22 or by providing a suitable resilient sealing material 61 on the sidewalls 58. The plenum chamber 60 is pneumatically connected to the upper portion space 18 by means such as the orifice 62 through the panel 22 and the grille 28. Therefore, the pressure in the plenum chamber 60 remains very close to the pressure in the upper portion space 18.

There are some times when the pressure below the floor 16 needs to be relieved into the space 18. Therefore, optional flapper doors 64 may be provided which, in conjunction with mating holes 66 in the plates 40 and 42 enable a flow upward through the plates 40 and 42 as shown by the arrows 68 in FIG. 2. The doors 64 are lightly spring-loaded closed by means of springs 70 so that they normally remain in the closed flow obstructing condition shown in FIGS. 1, 3 and 4.

Figure 3:
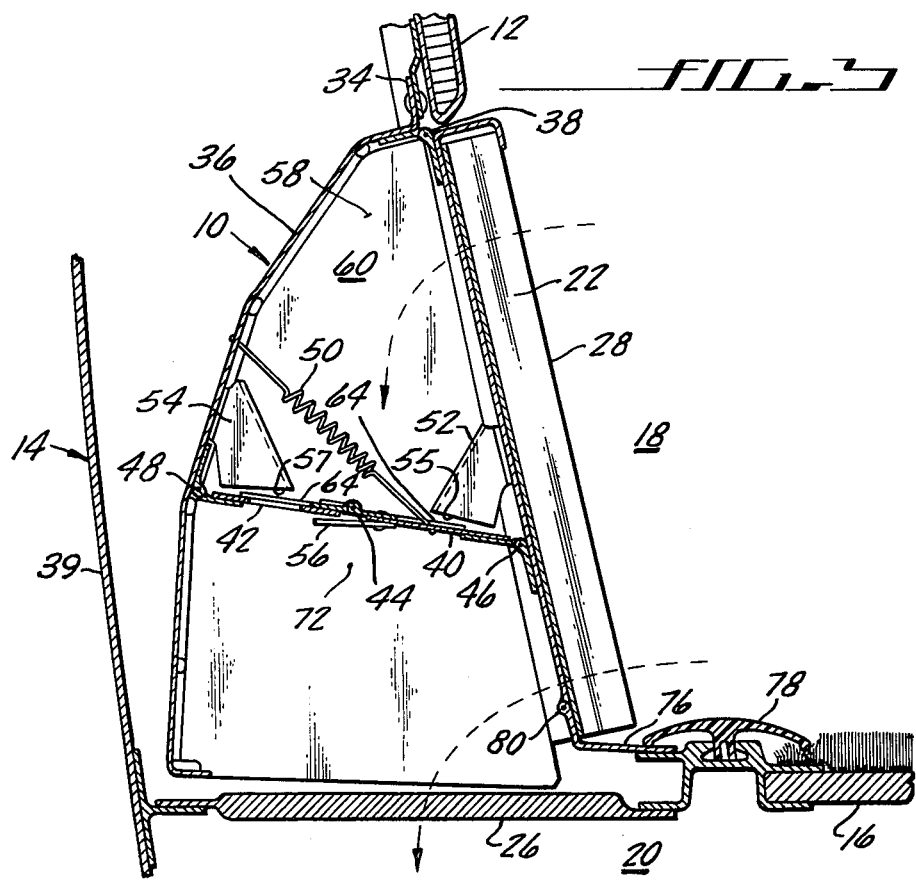
FIG. 3 is a view similar to FIG. 2 wherein a differential pressure of a predetermined value has been established across the floor structure of an aircraft and the vent structure is beginning to open a large vent area.
Figure 4:
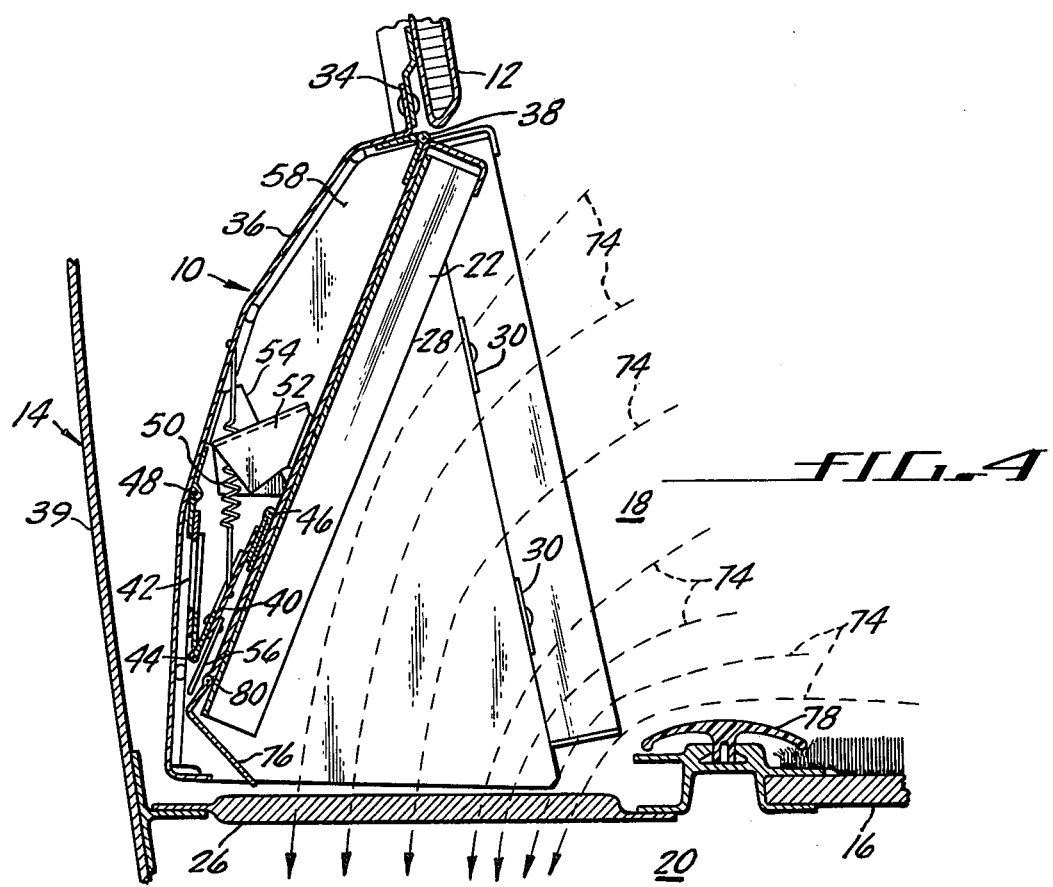
FIG. 4 is a view similar to FIGS. 2 and 3 wherein the vent panel has rotated out of the way to open a large vent area between the upper and lower portions of an aircraft fuselage to relieve pressure in the upper portion thereof.

When a differential pressure is established with the high pressure area above the floor 16, the differential pressure is also applied across the plates 40 and 42. As shown in FIG. 3, when the differential pressure reaches a predetermined amount to overcome the preload in the spring 50, the plates 40 and 42 start to rotate away from the stops whether they be stops 52 and 54 or stop 56. This movement eventually drives the plates beyond the overcenter, a location shown by the phantom hinge line 72 in FIG. 3. From this point on, the spring 50 causes further folding of the plates 40 and 42 which removes the structural bracing of the vent panel 22 pulling it toward the fuselage wall 39 to remove the flow restriction and allow a large flow of air indicated by the arrows 74 in FIG. 4. It should be noted that as the vent panel 22 moves toward the shell 36, a dust member 76 is pulled from under a resilient covering 78. The member 76 is required to prevent small fingers, hands, toys, fluids and, in addition, dust from undesirably falling beneath the floor 16. The member 76 can be connected to the vent panel by means of a hinge 80 so that it does not extend into the venting area to unnecessarily restrict the venting flow. The dust member 76 also restricts flow when the vent structure 10 is in its normal position so that the orifices 24 properly meter the flow of air conditioning, heating, and other desirable flows during normal operation of the aircraft. Alternately, a large cover member 78 could be used instead of the dust member 76. However, as the arrows 74 show, a large percentage of the flow is along the floor 16 and anything disrupting the flow in this area results in a disproportionate flow restriction when the vent structure 10 is open.

It should be noted that although the vent panel 22 is self actuating once the hinge 44 goes past the point 72, such need not be the case and in suitable circumstances the flow itself can push the panel 22 out of the way.

Once there is no longer need for emergency venting, the panel 22 can be moved from the position shown in FIG. 2 back to the position shown in FIG. 2 by merely pulling it toward the passenger compartment until the two plates 40 and 42 snap into their proper overcenter position in readiness for the next emergency.

Thus, there has been shown and described a novel vent structure which is suitable for providing emergency venting between the upper and lower portions of an aircraft fuselage and which fulfills all of the objects and advantages sought therefor. Many changes, alterations, modifications, and other uses and applications of the subject vent structure will become apparent to those skilled in the art after considering this specification and the accompanying drawings. All such changes, alterations, uses and modifications which do not depart from the spirit and scope of the invention are deemed to be covered by the invention which is limited only by the claims which follow.

What is claimed is:

1. A vent for equalizing the pressure on opposite sides of a structure comprising:
   a movable vent panel which in a first position restricts the flow from a first side of the structure to a second side thereof; and
   a plenum chamber pneumatically connected to the first side of the structure, said chamber having at least one movable wall having first and second sides, said first side of said movable wall being in pneumatic connection with the first side of the structure and said second side of said movable wall being in pneumatic connection with the second side of the structure so that differential pressure across the structure applies force to said wall, and bias means for urging said movable wall into a first position, said movable wall being operatively connected to said vent panel to maintain said movable vent panel in said first position thereof when said movable wall is in its first position whereby a predetermined differential pressure is capable of overpowering said bias means to move said movable wall to a position which allows said movable vent panel to move to a second position wherein flow from the first side of the structure to the second side is less restricted.

2. The vent defined in claim 1 including a second movable wall hingedly connected to the said first movable wall which also forms a portion of said plenum chamber.

3. The vent defined in claim 2 including stop means which restrict the relative motion of said first and second movable wall members to motion against said bias means when said first movable wall is in its first position.

4. The vent defined in claim 3 wherein said bias means are connected to urge said first and second movable walls toward said stop means until said first movable wall is moved a predetermined distance from said first position thereof, after which said bias means urge said first movable wall away from said first position thereof to said position of said first movable wall which allows said movable vent panel to move to said second position.

5. The vent defined in claim 4 wherein said vent panel forms a portion of said plenum chamber.

6. The vent defined in claim 5 including a vent housing having opposite side walls, said vent panel and said second movable wall being hingedly connected to said vent housing and said first movable wall being hingedly connected to said vent panel so that said plenum chamber is bounded by at least a portion of said vent housing including said opposite side walls, said first and second movable walls and at least a portion of said vent panel.

7. The vent defined in claim 6 wherein said bias means include a spring connected between said vent structure and said first movable wall, said spring being predeterminately preloaded when said first movable wall is in said first position.

8. The vent defined in claim 6 wherein said first movable wall is hingedly connected to said vent panel at an intermediate location thereon, said vent panel including a passageway for allowing restricted flow between the opposite sides of the structure.

9. The vent defined in claim 6 wherein said vent panel forms a portion of the interior wall adjacent the cabin floor of a pressurizable aircraft, said vent panel including a dust cover hingedly connected thereto to prevent flow between the floor and said vent panel when said vent panel is in its first position.

10. The vent defined in claim 2 wherein at least one of said movable walls includes pneumatic check valve means which enable flow of air from the second side of the structure into said plenum chamber when said second side of the structure is at a higher predetermine pressure than said first.

11. The vent defined in claim 1 including linkage means hingedly connected to said first movable wall to form an overcenter linkage therewith.

12. The vent defined in claim 11 including stop means which restrict relative motion between said first movable wall and said linkage means to motion against said bias means when said first movable wall is in its first position.

13. The vent defined in claim 12 wherein said stop means are mounted to said vent panel and include an abutment surface which engages said first movable wall when said first movable wall portion is in its first position.

14. The vent defined in claim 12 wherein said stop means include a plate connected to said first movable wall which bears against said linkage means when said first movable wall is in its first position.

15. A ventilation structure for relieving differential pressure across the passenger floor of an aircraft comprising:
   a duct formed to duct air between the areas above and below the floor of the aircraft;
   a grille, hingedly mounted to the aircraft which has first and second positions, the first position restricting the flow in the duct between the areas above and below the floor of the aircraft; and
   a plenum assembly positioned in said duct behind said grille, said plenum assembly having at least one movable wall having first and second sides, said first side of said movable wall being in pneumatic communication with the above floor area through said grille so that differential pressure across said floor applies force to said wall, and bias means for urging said movable wall into a first position, said movable wall being operatively connected to said grille to maintain said grille in said first position thereof when said movable wall is in its first position, when differential pressure is applied to said movable wall it moves allowing said grille to rotate to said second position opening said duct to less restricted flow.

16. The ventilation structure defined in claim 15 including a second movable wall hingedly connected to said first movable wall and operatively connecting said first movable wall to said grille.

17. The ventilation structure defined in claim 16 including stop means connected to one of said movable walls to restrict the hinge motion therebetween which would otherwise be caused by said bias means.

18. The ventilation structure defined in claim 17 wherein said bias means are connected to urge said first and second movable walls toward the angular relationship position restricted by said stop means until the differential pressure moves said first movable wall to a predetermined position different than said restricted position, after which said bias means urge said first movable wall away from said restricted position thereof.

* * * * *